United States Patent
Kennedy et al.

(10) Patent No.: US 6,536,025 B2
(45) Date of Patent: Mar. 18, 2003

(54) RECEIVER DESKEWING OF MULTIPLE SOURCE SYNCHRONOUS BITS FROM A PARALLEL BUS

(75) Inventors: Joseph T. Kennedy, Beaverton, OR (US); Shekhar Y. Borkar, Beaverton, OR (US); Matthew B. Haycock, Beaverton, OR (US); Stephen R. Mooney, Beaverton, OR (US); Aaron K. Martin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 09/858,346

(22) Filed: May 14, 2001

(65) Prior Publication Data

US 2002/0170024 A1 Nov. 14, 2002

(51) Int. Cl.[7] .............................................. G06F 17/50
(52) U.S. Cl. ........................ 716/6; 716/4; 716/5; 326/93
(58) Field of Search ............................ 716/4–6; 326/8, 326/9, 21, 31, 93, 94, 98; 375/356, 371, 376; 327/141, 144, 151

(56) References Cited

U.S. PATENT DOCUMENTS

| 3,789,400 A | 1/1974 | Towns ...................... 340/176.1 |
| 4,115,759 A | 9/1978 | Besenfelder ............. 340/146.1 |
| 4,503,495 A | * 3/1985 | Boudreau ................... 364/200 |
| 5,392,318 A | 2/1995 | Ellis et al. .................. 375/118 |
| 6,049,136 A | * 4/2000 | Humphrey et al. ......... 257/786 |
| 6,373,289 B1 | * 4/2002 | Martin et al. ................. 326/93 |
| 6,229,861 B1 | * 5/2002 | Young ........................ 375/356 |
| 6,437,601 B1 | * 8/2002 | Borkar et al. ................. 326/93 |

OTHER PUBLICATIONS

Geannopoulos et al, "An Adaptive Digital Deskewing Circuit for Clock Distribution Networks," IEEE, Feb. 1998, pp. 1–2.*

Hendarman et al,"A 1 Gb/s Deskew IC for Rambus Automatic Test Application," IEEE, Nov. 2000, pp. 89–92.*

Gotoh et al, "A 2B Parallel 1.2Gb/s Interconnect I/O Interface With Self–Configurable Link and Plesiochronous Clocking," IEEE, Feb. 1999, pp. 180–182.*

Tam et al, "Clock Generation and Distribution for the First IA–64 Microprocessor," IEEE, Nov. 2000, pp. 1545–1552.*

* cited by examiner

Primary Examiner—Vuthe Siek
(74) Attorney, Agent, or Firm—Blakely, Sokoloff, Taylor & Zafman LLP

(57) ABSTRACT

A receiver integrated circuit (IC) die or functional unit has deskew circuitry to reduce bit-to-bit timing variation that is no more than one bit time interval in a number of bits that are received, before validating the capture of the bits using a transition in a received strobe signal. The data bits and the strobe signal are driven in a parallel bus section that may be part of a shared multi-drop bus or a point-to-point bus. The system applications include interfacing to a processor or memory bus of a computer system.

18 Claims, 5 Drawing Sheets

504 — AT THE TRANSMITTER:
DRIVE ON EACH OF A NUMBER N OF DATA LINES A SEPARATE DATA SIGNAL THAT REPRESENTS A SEQUENCE OF BITS;

DRIVE A STROBE SIGNAL ON A STROBE LINE;

EACH GROUP OF N BITS IN THE DATA LINES, ONE BIT PER DATA LINE, ARE SYNCHRONIZED WITH A SEPARATE TRANSITION (E.G., LOW/HIGH TO HIGH/LOW VOLTAGE) FOR THE STROBE SIGNAL.

508 — AT THE RECEIVER:
BIT TO BIT TIMING VARIATION IS REDUCED USING DESKEW CIRCUITRY, BEFORE CAPTURING EACH GROUP OF N BITS USING THEIR RESPECTIVE TRANSITION IN THE STROBE SIGNAL

FIG. 5

704 — AT THE TRANSMITTER:
DRIVE ON EACH DATA LINE A SEPARATE, PERIODIC DATA TEST SIGNAL WHOSE TRANSITIONS ARE SYNCHRONIZED TO THOSE OF A PERIODIC STROBE TEST SIGNAL ON THE STROBE LINE.

708 — AT THE RECEIVER:
ALIGN CORRESPONDING TRANSITIONS IN THE DATA TEST SIGNALS WITH THE SAME TRANSITION IN THE STROBE TEST SIGNAL, BY SELECTING THE DELAY OF A DELAY ELEMENT FOR EACH DATA TEST SIGNAL.

FIG. 7

RECEIVER DESKEWING OF MULTIPLE SOURCE SYNCHRONOUS BITS FROM A PARALLEL BUS

BACKGROUND

This invention is generally related to high speed digital communications over a parallel bus coupled between integrated circuit (IC) functional units or dies of an electrical system, and more particularly to source synchronous transmissions in such systems.

Processor clock speeds in electrical systems are continuing to increase and show no signs of reaching a plateau. As a result, the bit rate in communications between IC functional units and IC dies in the rest of the system are forced to increase to maintain an optimum performance level in the system. One factor that limits the performance of a high speed system is timing variation or 'skew', that is a difference in the timing of the occurrence of a particular signal transition, between the actual system and what was expected or designed for the system. Timing variations may be caused by a combination of one or more factors, including those related to the manufacture of the system such as variations in on-die device parameters, the geometry of printed wiring board (PWB) lines, and IC package line length and impedance. Fatal system errors are more likely when timing variations exceed the maximum levels which the system has been designed to tolerate.

As bit rates increase, the maximum amount of timing variation between a received data signal and a distributed, central clock signal of the system decreases. One way to improve the tolerance of a system to timing variation is to use source synchronous transmissions. In such a transmission, the transmitter IC may synchronize each consecutive bit in a driven data signal with a corresponding, separate transition in a driven strobe signal. The data and strobe paths that carry the data and strobe signals between the receiver and the transmitter ICs are designed to be 'matched' so that the timing variation between transitions in the data and strobe signals at the receiver are minimized. However, as bit rates continue to increase beyond 500 MHz, the maximum timing variation tolerable by the logic functional circuitry in the receiver IC may be exceeded even by a source synchronous transmission.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

FIG. 5 illustrates a flow diagram of operations at the transmitter and at the receiver which includes a reduction in bit to bit timing variation.

FIG. 7 shows a flow diagram of operations at the transmitter and at the receiver, which includes a technique for determining the delays to which the data signals are subjected at the receiver to obtain the reduction in bit to bit timing variation.

DETAILED DESCRIPTION

In an electrical system having a parallel bus over which IC dies or functional units communicate with each other at high speed using source synchronous transmissions, the receiver IC die (or receiver functional unit) is enhanced with deskew circuitry at its front end to reduce bit to bit timing variations up to one bit time interval in multiple received bits. This is done before the capture of the bits is validated using a synchronizing transition in the strobe signal. The methodology helps the electrical system as a whole to tolerate a relatively significant amount of timing variation in the data signals to yield very high bit rates in source synchronous transmissions. This may be achieved with only a small increase in circuitry, namely the addition of the deskew circuitry in the receiver IC.

Figure 1:
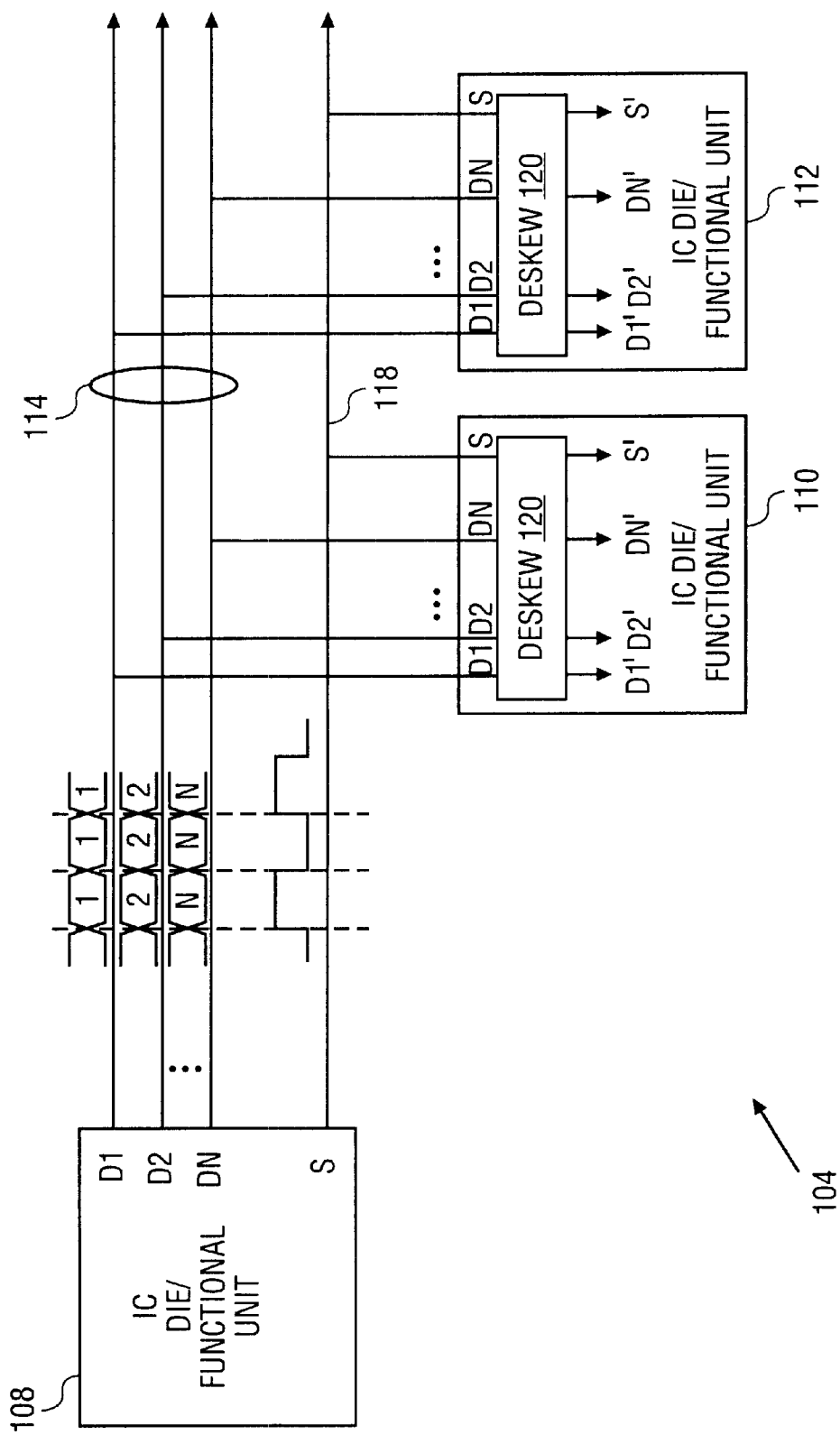
FIG. 1 shows a circuit diagram of part of an electrical system having a parallel bus to which IC deskew circuitry is coupled.

FIG. 1 shows a block diagram of part of an electrical system 104 in which a parallel bus section having a number of data lines 114 and a strobe line 118 are formed in a printed wiring board (PWB) or on an IC substrate. An IC die or functional unit 108, which will be referred to simply as an IC die, drives on each of the data lines 114 a respective data signal that represents a sequence of bits, as illustrated by the exemplary timing waveforms in FIG. 1 for D1, D2, . . . DN. The IC die 108 also drives strobe signals on the strobe line 118. As is common with source synchronous transmissions, the IC die 108 synchronizes a number of bits 1, 2, . . . N that are driven in the data lines 114, respectively, with the same transition in the strobe signal. The approximate time interval during which a bit is valid is referred to as a bit time interval.

FIG. 1 shows that each low to high and high to low transition in the voltage of the strobe line 118 is synchronized with N bits being generated on the data lines 114. An alternative here would be to have each group of N bits synchronized with only one of the low to high and high to low transitions in the strobe signal, rather than both transitions. In general, any scheme that provides a predetermined, fixed relationship in time between the generation of a bit on one of the data lines 114 and a corresponding transition in the strobe line 118 can be used.

The timing diagram in FIG. 1 shows that the center of each bit interval is approximately halfway between consecutive low to high and high to low transitions of the strobe signal. One alternative would be to delay the generation of the strobe pulse such that the center of each bit time interval coincides with a high to low or low to high transition of the strobe signal. Other schemes for synchronizing the bits that are driven in the data lines with a transition in the strobe signal can also be used.

As the data and strobe signals travel along the parallel bus, they are picked up by one or more receiver IC dies 110 and 112. Each receiver IC die 110 is coupled to receive the data signal from each of the data lines 114 and the strobe signal from the strobe line 118. The data and strobe signals are input to deskew circuitry 120 whose output provides data signals that have been deskewed or resynchronized using the strobe signal. These deskewed data signals are thus ready to be applied to latch circuitry (not shown) which captures the bit values in accordance with a transition in the strobe signal. The capture of the data signals using the strobe signal may be conventional and need not be discussed in detail here.

Although the word "data" is used to refer to the signals on lines 114, the actual information carried by the signals may alternatively be address values if, for instance, the IC die 110 is a solid state memory die. Thus, the references to "data" should be understood to include addresses of storage locations as well as the content of such locations.

Figure 2:
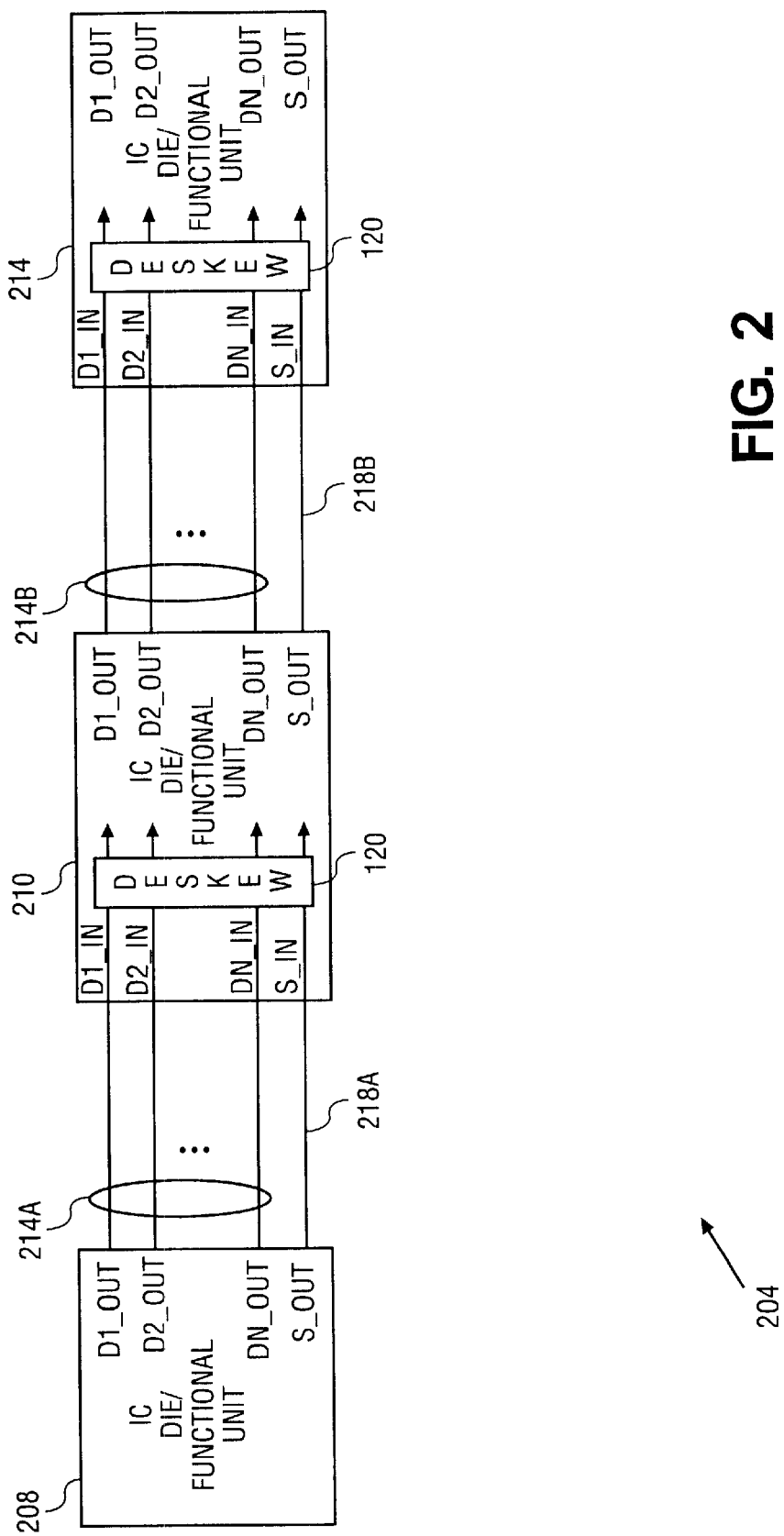
FIG. 2 illustrates a circuit diagram of part of an electrical system having a point to point bus also featuring the IC deskew circuitry.

FIG. 2 shows another electrical system 204 that is also enhanced with deskew circuitry 120. In this system, a transmitter IC die or functional unit 208 is coupled to a receiver IC die 210 via a parallel bus having data lines 214*a* and strobe line 218*a*. The receiver IC die 210 also acts as a transmitter in that it provides data and strobe output signals to another IC die 214 via data lines 214*b* and strobe line 218*b*. Thus, in contrast to the shared multi-drop bus of FIG. 1, FIG. 2 shows a point to point configuration of the parallel bus sections. In this configuration, the IC dies are communicatively coupled to each other by a point to point bus of which the parallel sections 214*a*/218*a* and 214*b*/218*b* are a part. In such a configuration, the IC die 210 also acts as a repeater, such that its input data and strobe signals are repeated onto the next segment of the point to point bus. The output data and strobe signals may be resynchronized after being deskewed, prior to being driven into the next segment of the point to point bus.

Figure 3:
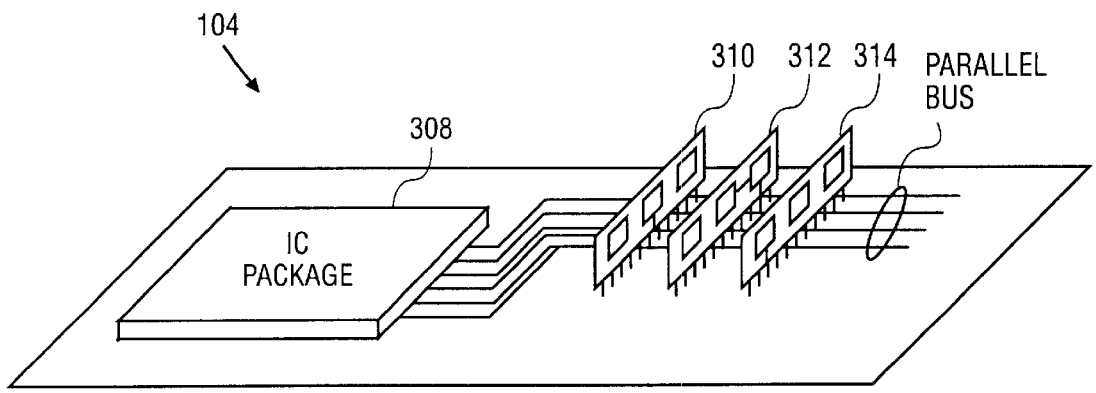
FIG. 3 shows a block diagram of part of an electrical system in which the IC deskew circuitry is place on separate printed wiring boards.

Turning now to FIG. 3, an implementation of the electrical system 104 featuring a parallel bus is shown in block diagram form as a computer system motherboard. The motherboard features a printed wiring board (PWB) on which an IC package 308 is installed to drive the data and strobe signals on the parallel bus that is formed within the PWB. The IC package 308 contains the IC die 108 (See FIG. 1). The parallel bus in FIG. 3 forms part of a shared multi-drop memory bus to which a number of memory modules 310, 312 and 314 are connected by being inserted in their separate slots. Each memory module includes at least one of the IC dies 110 and 112 (See FIG. 1) as a dynamic random access memory (DRAM) device. Other implementations for the systems of FIG. 1 and FIG. 2 are possible, including those in which the parallel bus, be it of the shared multi-drop variety or the point-to-point variety, is formed on an IC substrate such as a silicon substrate in which an I/O processor has been formed.

Figure 4:
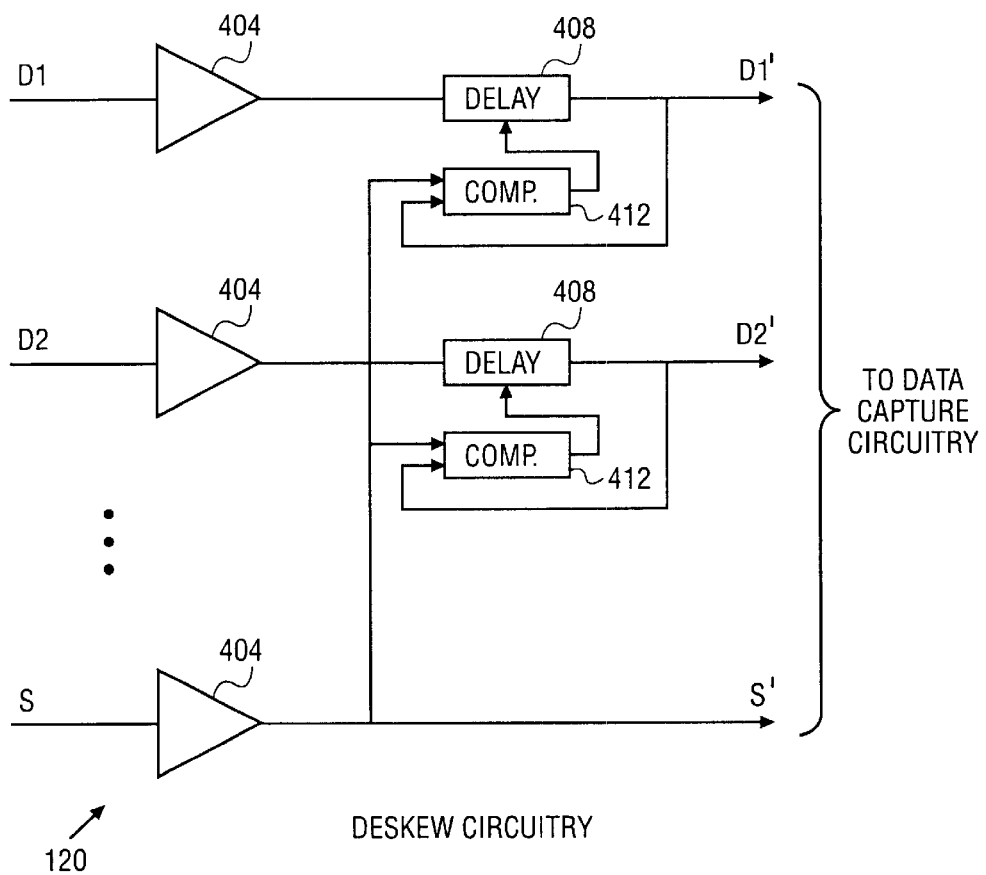
FIG. 4 depicts a block diagram of one implementation of the deskew circuitry.

Referring now to FIG. 4, a particular implementation of the deskew circuitry 120 is illustrated in block diagram form. A number of delay elements 408 are provided, where each is coupled to delay a respective data signal (D1, D2, ... DN) that has been received from the data line by a line receiver 404. The line receiver 404 serves in part to translate the signaling levels on the conductive lines of the parallel bus into those used by the logic circuitry in the IC die. The delay element 408 serves to delay the translated data signal by a predetermined time interval that is no longer then one bit interval. This predetermined time interval is selected such that the bit-to-bit timing variation between the bits in signals D1, D2 ... DN is reduced. A technique for determining this time interval for each delay element 408, using comparator circuitry 412, will be described below in FIG. 7.

Referring to FIG. 5, a process for operating an electrical system, according to either 104 or 204, at the transmitter and the receiver IC dies are described. The operations in block 504 are performed in the transmitter IC die while the operations in block 508 are performed in the receiver die.

Beginning with the transmitter, N separate data signals are driven on a number of data lines, respectively, where each data signal represents a sequence of bits. A strobe signal is also driven on a separate strobe line. Each group of N bits on the data lines, where there is one bit per data line, is synchronized with a separate transition, for instance a low to high or high to low voltage transition, in the strobe signal.

Figure 6:
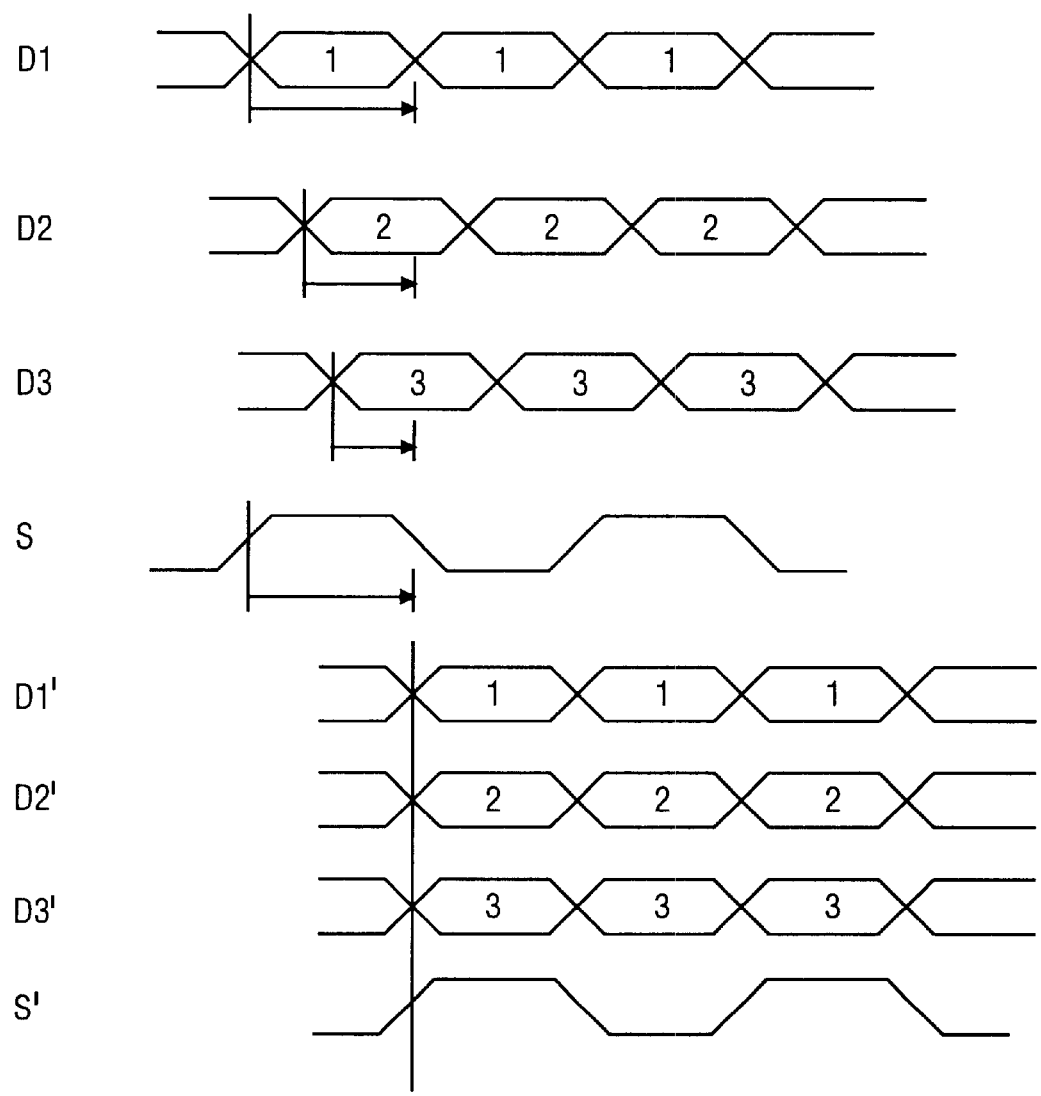
FIG. 6 depicts two sets of timing diagrams of an exemplary set of data and strobe signals, before and after deskewing.

After the data and strobe signals have been translated by the line receivers of the receiver IC die, the bit-to-bit timing variation among the different data signals is reduced using the deskew circuitry, before each group of N bits are captured and validated using their respective transition in the strobe signal. This means that the predetermined delay that is provided by each delay element 408 (See FIG. 4) has been previously fixed to an amount that realigns the center of each bit interval in a data signal with respect to a particular transition in the strobe signal. See FIG. 6 for an exemplary timing diagram of the received data signals D1, D2 and D3 and the deskewed/realigned data signals D1', D2' and D3'. After this realignment, the transition in the strobe signal S' may be used to latch the logic value that appears in each deskewed data signal D1', D2' or D3'.

Referring now to the flow diagram of FIG. 7, a technique is described for determining the actual delay that is to be presented by each delay element 408. This procedure may be performed upon initialization of the electrical system, prior to transferring any valid data between IC dies. Operations in block 704 are performed in the transmitter IC die whereas operations in block 708 are performed in the receiver IC die. Beginning with the transmitter, a separate, periodic data test signal is driven on each data line by the transmitter. Each transition of the periodic test signal is synchronized to a corresponding one in a strobe test signal that is also driven by the transmitter on the strobe line.

At the receiver, following a signal level translation by the buffer 404 (See FIG. 4), comparator circuitry 412 determines, for each data test signal, an average phase difference between each pair of corresponding transitions in the received strobe signal and in the data test signal. An amount of delay is then set in the corresponding delay element 408 to match this average phase difference. This delay amount may be assumed to be no greater than one bit interval, where it is also assumed that the maximum misalignment between the data signals is no more than one bit time interval. Other implementations of the deskew circuitry 120 allow for deskewing when the data signals have been misaligned by more than one bit interval. See, e.g., U.S. patent application Ser. No. 09/964,010 of Haycock and Casper (P11230). Once the delay amount has been set for each data signal, the transmitter IC is ready to receive valid data signals.

To summarize, various embodiments of receiver deskewing of multiple, source synchronous bits from a parallel bus have been described. In the foregoing specification, the invention has been described with reference to specific exemplary embodiments thereof. It will, however, be evident that various modifications and changes may be made thereto without departing from the broader spirit and scope of the invention as set forth in the appended claims. For instance, the above described receiver deskewing may be used in a wide range of digital IC applications, including processor IC package to memory subsystem, memory controller IC unit to a memory device such as a dynamic random access memory device, and memory device to another memory device using a point to point bus. The specification and drawings are, accordingly, to be regarded in an illustrative rather than a restrictive sense.

What is claimed is:

1. An electrical system comprising:
 a printed wiring board (PWB) having formed therein a parallel bus section including a plurality of data lines and strobe line;
 a first integrated circuit (IC) die installed on said PWB to drive (1) on each of the plurality of data lines a respective data signal that represents a sequence of bits, and (2) a strobe signal on the strobe line, the first IC to synchronize a plurality of bits driven in the plurality of data lines, respectively, with the same transition in the strobe signal; and
 a second IC die installed on said PWB to receive the data signal from each of the plurality of data lines and the strobe signal from the strobe line, the second IC die having deskew circuitry to reduce bit to bit timing variation that is no more than one bit time interval in the plurality of bits before validating their capture using the transition in the strobe signal.

2. The electrical system of claim 1 wherein the first and second IC dies are communicatively coupled to each other by a shared multi-drop bus of which the parallel bus section is a part.

3. The electrical system of claim 1 wherein the first and second IC dies are communicatively coupled to each other by a point to point bus of which the parallel bus section is a part.

4. The electrical system of claim 1 wherein the first and second IC dies are packaged in separate IC packages.

5. The electrical system of claim 4 wherein one of the separate IC packages is soldered to a second PWB, the second PWB being inserted into a parallel bus slot of the PWB.

6. The electrical system of claim 1 wherein the deskew circuitry includes a plurality of delay elements each being coupled to delay a respective data signal by a predetermined time interval being no longer than one bit interval that reduces the bit to bit timing variation in the plurality of bits.

7. The electrical system of claim 6 wherein the deskew circuitry further includes comparator circuitry having an output coupled to set the predetermined time interval in each of the plurality of delay elements, a plurality of first inputs each being coupled to an output of a respective delay element, and a second input coupled to the strobe line.

8. A method for operating an electrical system, comprising:
 driving on each of a plurality of data lines a respective data signal that represents a sequence of bits, and driving a strobe signal on a strobe line, the plurality of data lines and the strobe line being part of a parallel bus section formed in a printed wiring board (PWB) of the system;
 synchronizing a plurality of bits driven in the plurality of data lines, respectively, with the same transition in the strobe signal; and then
 receiving the plurality of bits and the transition in the strobe signal; and then
 reducing bit to bit timing variation that is no more than one bit time interval in the received plurality of bits before validating their capture using the transition in the driven strobe signal.

9. The method of claim 8 wherein the reduction in bit to bit timing includes delaying each of the received plurality of bits by a predetermined time interval, each time interval having been selected to align a received periodic data signal on the respective data line with a periodic clock signal on the strobe line, the received data signal having been transmitted from a first IC die installed on the PWB and received by a second IC die installed on the PWB.

10. The method of claim 9 wherein the driving and synchronizing operations are performed in the first IC die and the receiving and bit to bit timing reduction are performed in the second IC die.

11. A method for operating an electrical system, comprising:
 driving on each of a plurality of data lines a respective data signal that represents a sequence of bits, and driving a strobe signal on a strobe line, the plurality of data lines and the strobe line being part of a parallel bus section formed on an integrated circuit (IC) substrate of the system;
 synchronizing a plurality of bits driven in the plurality of data lines, respectively, with the same transition in the strobe signal; and then
 receiving the plurality of bits and the transition in the strobe signal; and then
 reducing bit to bit timing variation that is no more than one bit time interval in the received plurality of bits before validating their capture using the transition in the strobe signal.

12. The method of claim 11 wherein the reduction in bit to bit timing includes delaying each of the received plurality of bits by a predetermined time interval that is no longer than one bit time interval, each time interval having been selected to align a received periodic data signal on the respective data line with a periodic clock signal on the strobe line, the received data signal having been transmitted from a first IC functional unit formed on the IC substrate and received by a second IC functional unit formed on the IC substrate.

13. The method of claim 12 wherein the driving and synchronizing operations are performed in the first IC functional unit and the receiving and bit to bit timing reduction are performed in the second IC functional unit.

14. An electrical system comprising:
 an integrated circuit (IC) substrate having formed thereon a parallel bus section including a plurality of data lines and strobe line;
 a first IC functional unit formed on said IC substrate to drive (1) on each of the plurality of data lines a respective data signal that represents a sequence of bits, and (2) a strobe signal on the strobe line, the first IC functional unit to synchronize a plurality of bits driven in the plurality of data lines, respectively, with the same transition in the strobe signal; and
 a second IC functional unit formed on said IC substrate to receive the data signal from each of the plurality of data lines and the strobe signal from the strobe line, the second IC functional unit having deskew circuitry to reduce bit to bit timing variation that is no longer than one bit time interval in the plurality of bits before validating their capture using the transition in the strobe signal.

15. The electrical system of claim 14 wherein the first and second IC functional units are communicatively coupled to each other by a shared multi-drop bus of which the parallel bus section is a part.

16. The electrical system of claim 14 wherein the first and second IC functional units are communicatively coupled to each other by a point to point bus of which the parallel bus section is a part.

17. The electrical system of claim 14 wherein the deskew circuitry includes a plurality of delay elements each being coupled to delay a respective data signal by a predetermined time interval that is no longer than one bit time interval and that reduces the bit to bit timing variation in the plurality of bits.

18. The electrical system of claim 17 wherein the deskew circuitry further includes comparator circuitry having an output coupled to set the predetermined time interval in each of the plurality of delay elements, a plurality of first inputs each being coupled to an output of a respective delay element, and a second input coupled to the strobe line.

* * * * *